Figure 1:
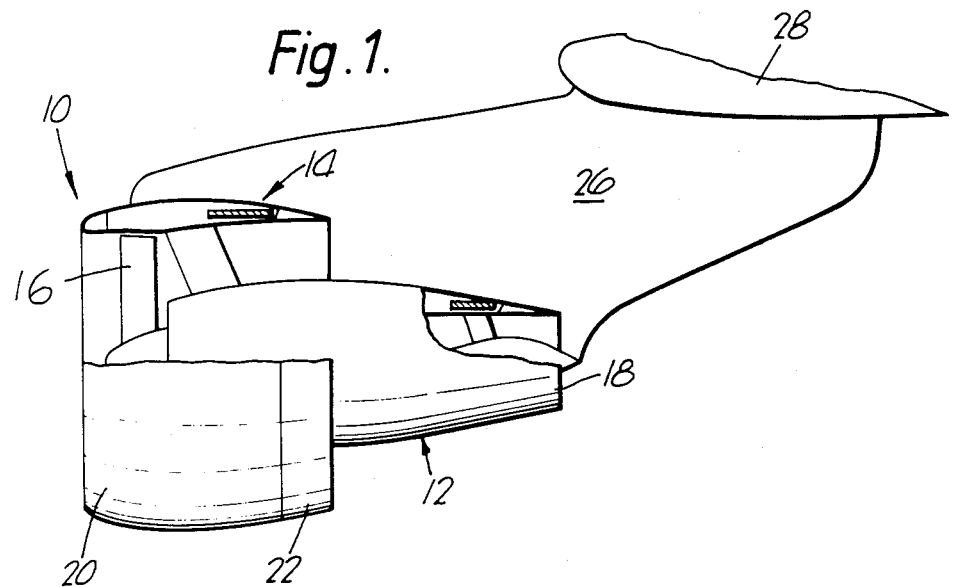

United States Patent [19]

Newton

[11] Patent Number: 4,716,724
[45] Date of Patent: Jan. 5, 1988

[54] GAS TURBINE ENGINE POWERPLANT WITH FLOW CONTROL DEVICES

[75] Inventor: Arnold C. Newton, Derby, England

[73] Assignee: Rolls-Royce plc, London, England

[21] Appl. No.: 10,493

[22] Filed: Feb. 3, 1987

[30] Foreign Application Priority Data

Apr. 25, 1986 [GB] United Kingdom ............... 8610180

[51] Int. Cl.$^4$ ................................. F02K 3/02
[52] U.S. Cl. .................................. 60/226.2; 60/229; 239/265.29; 239/265.31
[58] Field of Search .............. 60/226.2, 229, 230, 60/232, 262, 242, 271; 239/265.31, 265.29, 265.33; 244/110 B

[56] References Cited

U.S. PATENT DOCUMENTS

| | | | |
|---|---|---|---|
| 3,820,719 | 6/1974 | Clark | 239/265.31 |
| 3,831,376 | 8/1974 | Moorehead | 60/226.2 |
| 3,988,889 | 11/1976 | Chamay et al. | 60/226.2 |

FOREIGN PATENT DOCUMENTS

| | | | |
|---|---|---|---|
| 1187491 | 2/1965 | Fed. Rep. of Germany | 239/265.29 |
| 800770 | 9/1958 | United Kingdom | 239/265.29 |
| 1421153 | 1/1976 | United Kingdom | 60/226.2 |
| 2156004 | 10/1985 | United Kingdom | 60/229 |

*Primary Examiner*—Louis J. Casaregola
*Assistant Examiner*—Donald E. Stout
*Attorney, Agent, or Firm*—Cushman, Darby & Cushman

[57] ABSTRACT

In a gas turbine engine powerplant which has a requirement for both nozzle outlet area variation and thrust reversal, there is provided a common actuating means in the form of rams which firstly move a cowl portion so as to open a radial gap and thereby effectively increase the nozzle outlet area, and secondly move reverser cascades in a downstream direction into the gap created by moving the cowl portion. A lost motion device is fitted so as to enable achieving of the former movement without affecting the latter movement until such time as the latter movement is also required.

3 Claims, 4 Drawing Figures

GAS TURBINE ENGINE POWERPLANT WITH FLOW CONTROL DEVICES

This invention relates to a gas turbine powerplant of the kind which is used to power an aircraft. The varying flight regimes of an aircraft, namely takeoff, cruise and landing, necessitate that the engine which powers it has to have a capability of passing a largely variable flow of air through its system. For example on takeoff, the engine is run at full throttle and requires a large amount of air. At cruise the engine is throttled back and does not require so much air, and on landing the engine again may in the first instance be throttled back but then if reverse thrust is needed the throttle is again opened after the appropriate reverse thrust device is brought into play.

It is not always possible to design a powerplant which has a fixed through flow geometry and yet will provide all the necessary variations in through-flow to suit the particular flight regimes. It follows from this that variables have to be introduced, for example the capability to vary the area of the outlet nozzle of the flow path. This can result in the introduction of equipment and equipment actuating means of great weight and complexity.

The present invention seeks to provide a gas turbine engine powerplant with flow control devices of greatly simplified form.

According to the present invention a gas turbine engine powerplant includes a streamline casing, a portion of which is translatable axially of the powerplant and the fixed remainder of which contains a translatable, reversing cascade and common means for moving both the translatable cowl portion to open successive first and second magnitudes of gap in the streamline casing and the translatable cascade to a position in said second gap.

The gas turbine engine powerplant may comprise a core gas generator and a fan stage which is driven by the said core gas generator and projects radially outwardly thereof, and the streamline casing may comprise a fan cowl which surrounds the fan stage.

Preferably the common means comprises ram mechanisms which are equally angularly spaced around the interior of the streamline casing, and connected via rods in series with the translatable cascade and the translatable cowl portion and include lost motion features so as to initially enable translation of the cowl portion without translating the cascade, so as to achieve said first magnitude of gap.

Preferably the lost motion features comprise the ram rods passing through the cascade in close sliding relationship and fixed by their free ends to the upstream end of the translatable cowl and a collar fixed to each rod in spaced relationship with and upstream of a respective cascade, which space equals the magnitude of the first said gap.

The invention will now be described by way of example, and with reference to the accompanying drawings in which:

FIG. 1 is a diagrammatic view of a gas turbine engine powerplant incorporating an embodiment of the present invention.

Figure 2:
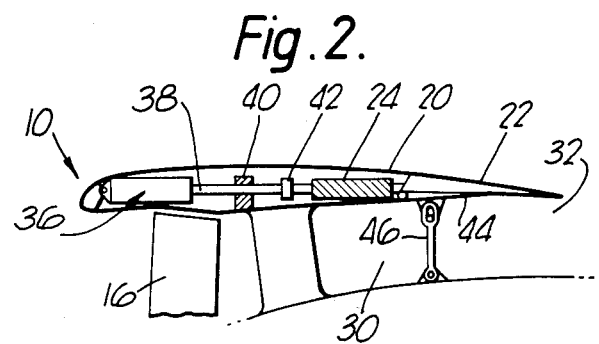
Figure 3:
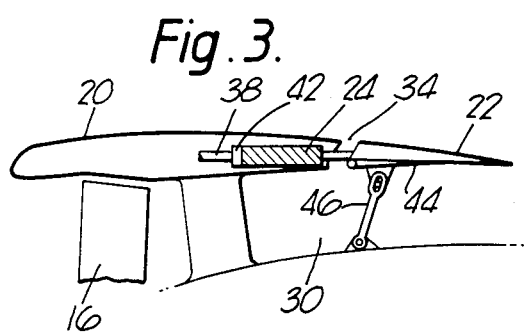
Figure 4:
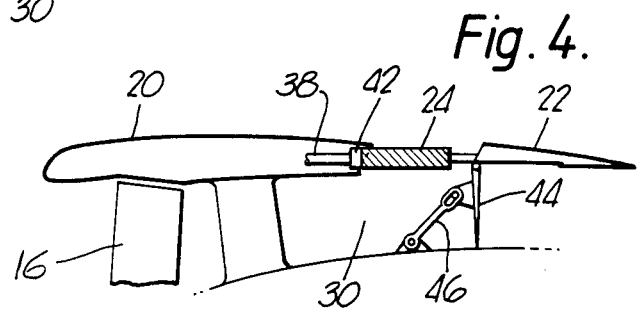

FIGS. 2-4 inclusive are common enlarged part views of the gas turbine engine powerplant of FIG. 1 in varied operating modes.

Referring now to FIG. 1. A gas turbine engine powerplant 10 includes a core gas generator 12 surrounded by a cowl 14 which in turn surrounds a stage of fan blades 16. The fan blades 16 are connected for driving by the core gas generator 12.

The cowl 14 is streamlined as is the casing 18 which surrounds the core gas generator 12. The cowl 14 has a fixed upstream portion 20, and a translatable downstream portion 22. The fixed upstream portion 20 contains a number of equally angularly spaced reverser cascades 24 which in a non-operative position rest adjacent the downstream end of the fixed portion. The reverser cascades are translatable as will be described later in this specification.

The powerplant 10 is connected via a pylon 26 to an aircraft wing 28 in known manner.

Referring now to FIGS. 2-4. The powerplant 10 of the particular example is of course a ducted fan gas turbine engine powerplant. The geometry of the fan duct 30 of the powerplant 10 is such that when an aircraft powered by the powerplant 10 is at cruise, the outlet area of the fan nozzle 32 gives the thrust characteristics which are required when the two cowl portions 20,22 are abutting as shown in FIG. 2. On takeoff of the aircraft however, the throttle setting is such as to generate a far greater flow of air through the duct than can be handled by the outlet nozzle 32. Consequently the outlet area of the nozzle 32 has to be increased. In the present invention this is achieved by moving the cowl portion 22 in a downstream direction to the position shown in FIG. 3, an annular gap 34 is thus created.

Referring back to FIG. 2, movement of the downstream cowl portion 22 is achieved by use of rams 36, a number of which are equi-angularly spaced around the interior of the fixed cowl portion 20. The rams 36 are connected via rods 38 to the downstream cowl portion 22. The rods 38 are supported on bearings 40 and are thus prevented from buckling. The rods 38 are also a sliding fit in respective reverser cascades 24 and each rod 40 passes right through its respective reverser cascade 24.

A collar 42 is fastened to each rod 40 and in the position shown in FIG. 2, is spaced from the reverser cascade 24 by a distance equal in magnitude to the gap 34 in FIG. 3. It will thus be appreciated that the gap 34 can be achieved without any movement occuring of the reverser cascades 24.

When the aircraft (not shown) reaches cruise altitude the powerplant 10 is throttled back and the ram mechanism 36 are actuated so as to close the gap 34.

Referring now to FIG. 4. When the aircraft lands it is required to select reverse thrust so as to provide a braking effect on the aircraft. The ram mechanisms 36 are thus actuated and their operation is maintained so as to cause the collars 42 to abut their respective reverser cascades and continue to push the cascades 24 until such time as the cascades 24 and the cowl portion 22 reach the position shown in FIG. 4.

The cowl portion 22 carries a number of blocker flaps 44 on its inner surface and on extension of the cowl portion 22 to the extent shown in FIG. 4, links 46 which have one end fixed to the casing which surrounds the core gas generator 12 and their other ends fixed to the blocker flaps 44, cause the blocker flaps 44 to swing across the fan duct. The fan air is thus directed radially outwardly of the fan duct and forwardly by action of the reverser cascade 24 thereon.

Whilst the cowl portions 22 may depend for support on the ram rods 38, the reverser cascades will have to be supported for sliding movement on rails which will be fixed to the interior of the cowl portion 20.

Biasing means not shown may be provided for the purpose of biasing the reverser cascades 24 into their retracted positions shown in FIGS. 2 and 3 so as to counter any possible differential in air pressure across the cowl wall, which may tend to force the cascades to their extended position before such a position is required. Such biasing means will ensure that ram pressure alone is not relied upon to keep the cascades in their retracted positions.

The upstream ends of the cascades 24 may be connected by a unison ring (not shown). The rams 36 may then only total three which are equi-angularly spaced around the casing 20.

I claim:

1. A gas turbine engine powerplant including a streamlined casing, a portion of which is translatable axially of the powerplant and the fixed remainder of which contains translatable reverser cascade means and common means for moving both the translatable portion through a first predetermined distance to open a gap of a selected axial dimension in the streamlined casing without moving said translatable reverser cascades and for moving both said portion and said translatable cascades through a second selected distance so as to enlarge said gap, said common means comprising ram mechanisms which are equi-angularly spaced around the interior of said streamlined casing, and connected via rods in series with said translatable cascades and said translatable portion and including lost motion means so as to initially enable translation of said portion without translating said cascades as said portion is moved through said first distance to open said gap, said lost motion means comprising ram rods passing through said cascades in close sliding relationship, said ram rods having free ends fixed to the upstream end of said translatable portion, each said ram rod having a fixed collar thereon in spaced relationship with and upstream of a respective cascade a distance equal to said selected first distance.

2. A gas turbine engine powerplant as claimed in claim 1 wherein said collars are fixed on said ram rods so as to engage said respective reverser cascades to move said reverser cascades through said selected second distance into said gap.

3. A gas turbine engine powerplant as claimed in claim 1 comprising a core gas generator and a fan stage which is driven by the said core gas generator and projects radially outwardly thereof, and wherein the streamlined casing comprises a fan cowl which surrounds the fan stage.

* * * * *